United States Patent [19]

Case et al.

[11] Patent Number: 5,280,572
[45] Date of Patent: Jan. 18, 1994

[54] METHOD AND APPARATUS FOR STORING TEXT DATA IN SUBCODE PACKS

[75] Inventors: Michael Case, Agoura; Walter R. Klappert, Topanga, both of Calif.

[73] Assignee: Time Warner Interactive Group Inc., Burbank, Calif.

[21] Appl. No.: 543,044

[22] Filed: Jun. 22, 1990

Related U.S. Application Data

[63] Continuation-in-part of Ser. No. 211,355, Jun. 24, 1988, Pat. No. 4,942,551.

[51] Int. Cl.⁵ .................... G11B 7/00; G11B 20/00; G06F 3/06
[52] U.S. Cl. ...................... 395/144; 369/49; 369/70; 369/47; 369/59; 360/32; 360/48; 358/335; 358/342; 364/DIG. 2; 364/943.44; 364/943; 364/952.31; 364/952.2
[58] Field of Search ............ 369/70, 49, 59, 33, 369/32, 47, 41, 43, 70, 48, 50; 360/32, 48, 25, 27, 32, 47, 48; 395/148, 144, 100; 358/335, 342, 341

[56] References Cited

U.S. PATENT DOCUMENTS

| | | | |
|---|---|---|---|
| 4,463,444 | 7/1984 | Daniels et al. | 364/900 |
| 4,641,295 | 2/1987 | Furukawa et al. | 369/32 |
| 4,682,317 | 7/1987 | Tomisawa | 369/59 |
| 4,707,818 | 11/1987 | Suzuki et al. | 369/59 |
| 4,729,043 | 3/1988 | Worth | 358/342 |
| 4,775,969 | 10/1988 | Osterlund | 369/53 |
| 4,779,252 | 10/1988 | Custers et al. | 369/32 |
| 4,789,975 | 12/1988 | Taniyama | 369/50 |
| 4,995,026 | 2/1991 | Makabe et al. | 369/70 |
| 4,996,679 | 2/1991 | Yoshio | 369/33 |
| 5,016,113 | 5/1991 | Yamashi et al. | 358/335 |
| 5,065,252 | 11/1991 | Yoshio et al. | 358/335 |
| 5,089,899 | 2/1992 | Nomura et al. | 358/335 |
| 5,130,966 | 7/1992 | Yoshio et al. | 369/49 |

Primary Examiner—Kevin A. Kriess
Attorney, Agent, or Firm—Blakely, Sokoloff, Taylor & Zafman

[57] ABSTRACT

An apparatus and method for encoding data in a text format such as ASCII or EBCDIC on a laser disc or compact disc without affecting the digitized sound by utilizing what is known as the subcode channel of the laser disc or compact disc. By storing text data in the subcode channel region as described herein, it is possible to create subtitles for movies in a number of languages such that the language in which the subtitles appear is user selectable. In this manner, it is possible to create laser discs having subtitle information in, for example, ten languages thereby avoiding the necessity of creating ten separate laser discs, each having a different language used for subtitling.

15 Claims, 6 Drawing Sheets

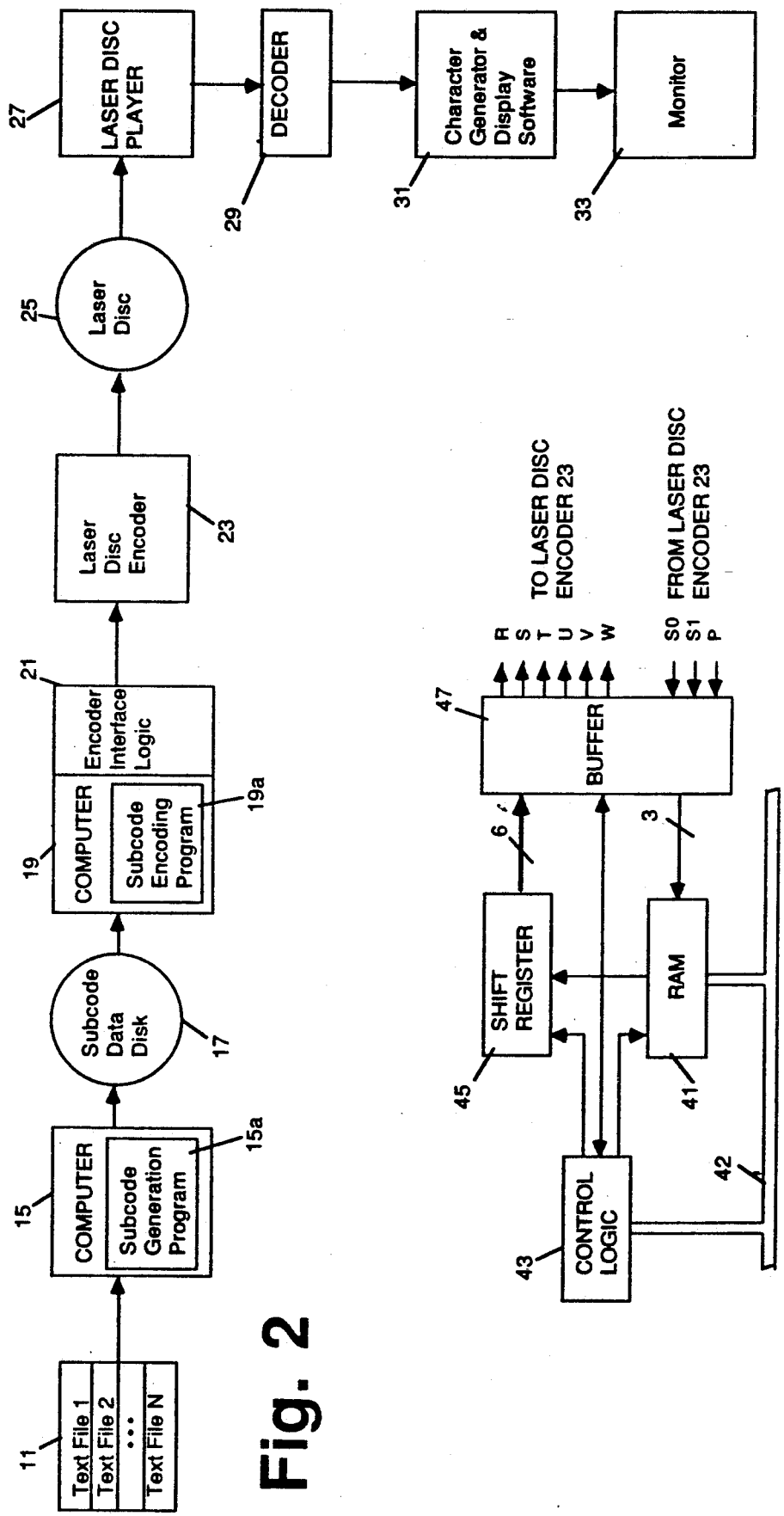

Fig. 4a, Fig. 4b, Fig. 4c

METHOD AND APPARATUS FOR STORING TEXT DATA IN SUBCODE PACKS

This is a continuation-in-part of application Ser. No. 211,355 filed Jun. 24, 1988 now U.S. Pat. No. 4,942,551 which issued Jul. 17, 1990.

SUMMARY OF THE INVENTION

The present invention is an apparatus and method for encoding data in text format on a laser disc or compact disc without affecting the digitized sound by utilizing what is known as the subcode channel of the laser disc or compact disc. The subcode channel is a portion of a laser or compact disc which is reserved for information other than digitized audio data. Presently, laser discs use 95% of their audio capacity, and compact discs use 95% of their entire capacity, to store digitized sound in an area called the main channel, leaving 5% for what is called the subcode channel or area. The main channel and the subcode channel of a laser disc are organized and used like the main channel and subcode channel of an audio compact disc. The subcode channel, which corresponds to about 30 megabytes of data capacity, whether on a compact disc or a laser disc, to the extent it is utilized at all, is usually used for graphics information or MIDI information as described in U.S. patent application Ser. No. 211,355 U.S. Pat. No. 4,942,551 filed: Jun. 24, 1988 (MIDI) and U.S. Ser. No. 287,423, U.S. Pat. No. 4,992,886 filed: Dec. 20, 1988 (graphical). In order to access subcode data, it is necessary for a laser or compact disc player to include a decoder to decode the subcode data. To make text encoded data (e.g., ASCII or EBCDIC) stored in the subcode area available for display or other use, it is necessary to modify the player to include subcode decoding circuitry, if not already present, and include appropriate software to access and use the text encoded data. In this connection, if a laser disc or compact disc player includes a graphics decoder, most of the necessary circuitry would be included in the graphics decoder. If a graphics decoder is not present, the necessary circuitry would need to be added to access the text data encoded in the subchannel area according to present invention. In either event, additional software is needed convert the text data in the subcode channel to a form capable of being displayed on a television or other monitor.

By storing text data in the subchannel region as described herein, it is possible to create subtitles for movies in a number of languages such that the language in which the subtitles appear is user selectable. In this manner, it is possible to create laser discs having subtitle information in, for example, ten languages thereby avoiding the necessity of creating ten separate laser discs each having a different language used for subtitling.

Inasmuch as the present invention is for encoding subtitling information on laser discs, the description herein will be directed to laser discs rather than compact discs, although it should be understood that the techniques described herein would also apply to compact discs, since as noted above, the main channel and subcode channel of laser discs and compact discs are identical for all practical purposes.

BRIEF DESCRIPTION OF THE DRAWINGS

FIG. 2 is a block diagram showing the components needed to practice the present invention.

FIG. 3 is a schematic of a circuit for implementing encoder interface logic 21.

FIG. 4a shows an encoding scheme for storing header information for a sequence of subcode packs which contain text encoded data.

FIG. 4b shows an encoding scheme for storing text encoded data in a subcode data pack following the pack containing the header information.

FIG. 4c shows an encoding scheme for the subcode data pack which contains the End of System Exclusive command.

DETAILED DESCRIPTION OF THE INVENTION

Figure 1:
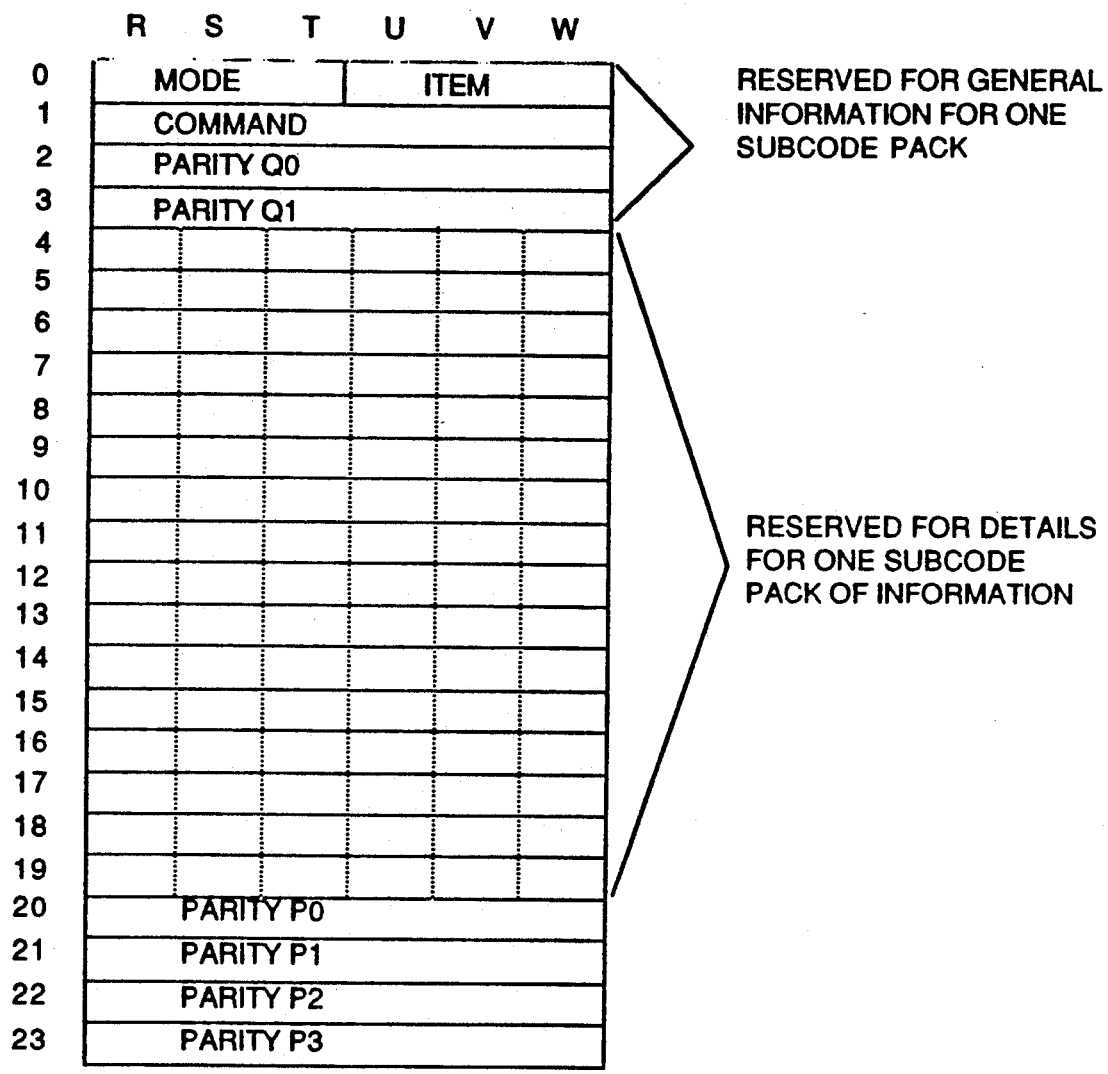
FIG. 1 shows the format of a subcode data pack for a laser disc or compact disc.

Laser discs, by an industry standard, set aside 5% of the possible audio data storage area for data other than audio. In other words, 95% of the possible data storage is used to store a digitized sound track. The reserved 5% portion known as the subcode channel, in effect, stores purely numerical data in a specified format. In particular, data in the subcode channel is stored in packs of 24 words with each word consisting of 6 bits labeled R, S, T, U, v and W respectively as shown in FIG. 1. Each of the bits in the subcode channel is one of 6 sub channels. Details regarding the format of subcode data on a compact disc are set forth in a document known as the "Red Book" which is a technical specification created by Philips N.V. and Sony Corporation entitled "Compact Disc Digital Audio System Description." The foregoing details are found in the section entitled "Sub Channels R, S, T, U, v and W."

The invention is directed to a technique for converting text information into subcode data which may be recorded, for example, on a transportable hard disk or floppy diskettes for subsequent conversion to signals which are input to a laser disc encoder which places the text information into the subcode channel. Alternatively, the subcode data may be directly converted into a form usable by a laser disc encoding device. A block diagram illustrating the various components needed to convert the text information into data which may be encoded into the subcode channel of a laser disc is shown in FIG. 2 as text source 11, computer 15 which, under control of program 15a performs the conversion from text encoded data to subcode data, disk 17 which stores the subcode data, computer 19 with encoder interface logic 21 which, under control of program 19a generates signals to be input to laser disc encoding device 23, and laser disc encoding device 23 which places digitized video data and digitized audio main channel data and subcode data onto laser disc 25. Laser disc player 27 with subcode channel decoder 29 passes as its output data from the subcode channel which is converted by a character generator and display software 31 for display on a video display 33 such as a television. Laser disc player 27 and decoder 29 and video display 33 are devices well known in the prior art available from various sources including Pioneer Corporation.

Source 11 may be any source of text encoded data such as a file created by a word processor containing lines of dialog. In the preferred embodiment, one text file, shown as text file 1 through text file N in FIG. 2, where N is the number of different languages for which it is desired to encode subtitle data, is created for each of the N languages. Computers 15 and 19 may be any general purpose digital computer. In the preferred embodiment, an IBM PC/AT or compatible is used. The software necessary to convert the text encoded data to subcode data will be described below. The subcode data created by the program 15a in computer 15 is written to disk 17 which is a standard floppy diskette or other transportable medium for data storage. A transportable medium is used because the text encoded data is generally created at a different time and place than that at which the laser disc is encoded with the digitized audio data and text encoded data.

When the laser discs are to be produced, the text encoded data on floppy diskette or other magnetic media 17 is read by computer 19 and converted by program 19a and interface board 21 into the necessary electrical signals needed to drive laser disc encoder 23. Interface board 21, as shown in FIG. 3, takes bytes of subcode data including text information which have been loaded into RAM 41 from disk 17 and using serial to parallel shift register 45, loads buffer 47 with R, S, T, U and v subcode data. RAM 41 is loaded with the subcode data under program 19a control which reads disk 17, and places the data on bus 42 for storage in RAM 41. The details concerning the foregoing components of board 21 are well within the skills of those skilled in the relevant art and, therefore will not be set forth herein. Similarly, encoder 23 is a standard laser disc mastering/pressing apparatus available from Phillips N.V., Sony Corporation, Matsushita and others which may need to be modified to accept the signals generated by interface board 21. The specific modifications which may be needed are dependent upon the particulars of the encoder and would be readily apparent to persons skilled in the art and therefore will not be described herein.

The details concerning the programs 15a and 19a used to convert text data into a form which may be converted into signals for use by encoder 23 are as follows.

Figure 4A:
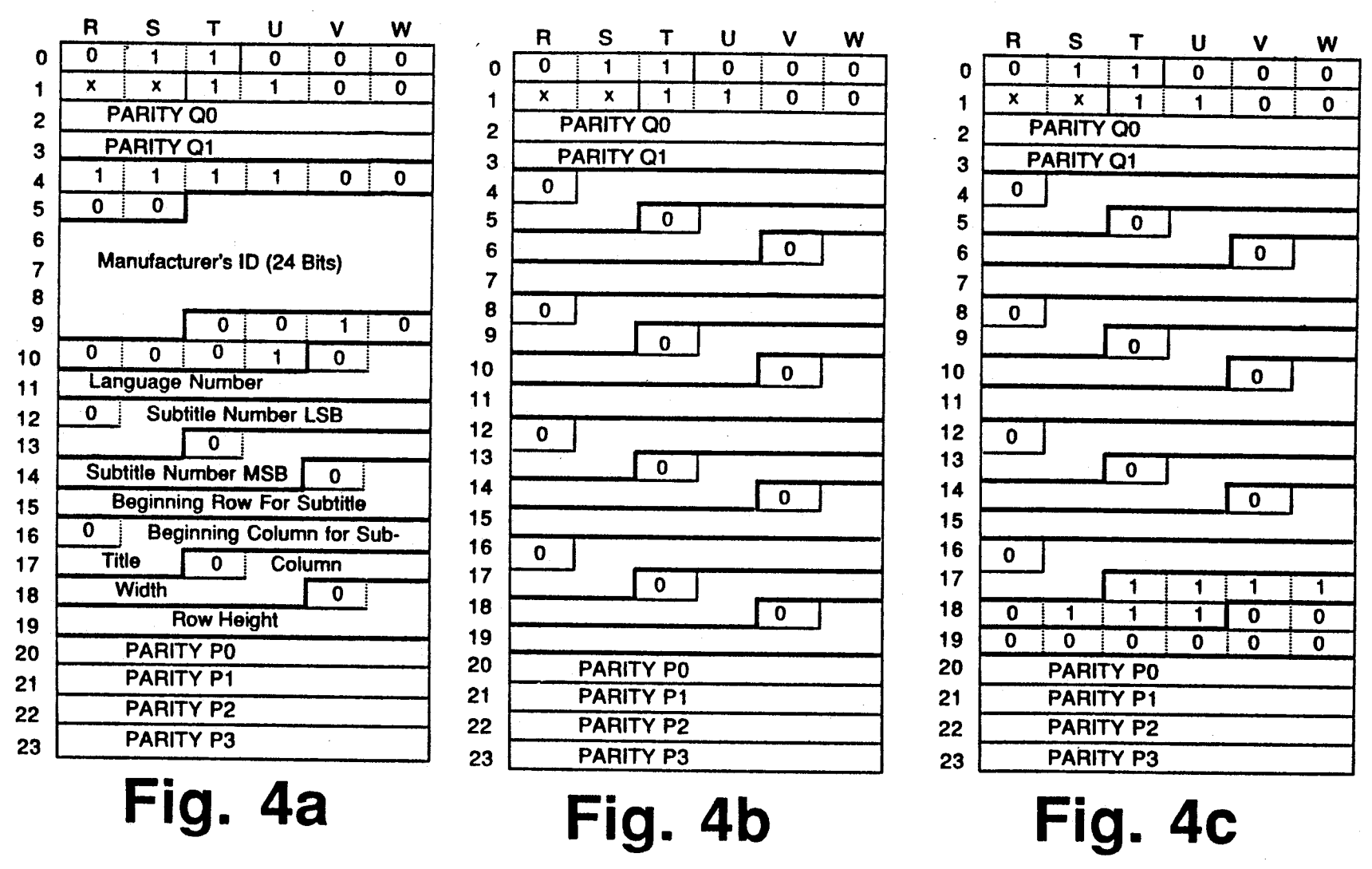

An example of how text data may be encoded into subcode packs is shown in FIGS. 4a, 4b, and 4c with FIG. 4a showing the format of a subcode pack for a header record of subtitling information, FIG. 4b showing the format of a subcode pack for a data record containing subtitling information and FIG. 4c showing the format of a subcode pack for a data record containing an end of system exclusive command. In this example, the packs are encoded as having MIDI data by setting Mode=3 and Item=0 in word 1. In word 2, subchannels T-W, "1100" is placed indicating that the pack contains 12 MIDI bytes. Words 2 and 3 contain required parity data. The first entry is specified as initiating a system exclusive by placing "11110000" in word 4, subchannels R-W and word 5 subchannels R and S. A manufacturer's I.D. is placed in word 5, subchannels T-W, words 6-8, subchannels R-W and word 9, subchannels R and S. The manufacturer's I.D. is unique to a manufacturer of MIDI equipment and is assigned by MMA (MIDI Manufacturers Association) and the JMSC (Japan MIDI Standards Committee). Word 9, subchannels T-W and word 10, subchannels R-U always contain "00100001" to specify that subtitle data follows. If the text data in the subcode packs is used for something other than subtitle data, another code could be used to distinguish that other use. In this connection, the particular code used in word 9, subchannels T-W and word 10, subchannels R-U, was chosen arbitrarily and does not form part of the present invention. In this connection, it should also be understood that the particular codes in words 0, 1 and words 4-9 through subchannels R and S are needed to conform to MIDI and Red Book standards, and may be changed if such standards change or if it is not necessary to conform to such standards. Following the subtitle identifier in the header record are the fields Language Number, Subtitle Number LSB, Subtitle Number MSB, Beginning Row for Subtitle, Beginning Column for Subtitle Column Width and Row Height, each having a length of seven bits plus a leading binary 0.

Although the seven available bits allows each of the foregoing fields to range between 0 and 127, generally, the data in such fields, as a practical matter, cannot take all possible values in the range. For example, the field Language Number represents the number of different languages in which subtitle information has been included on the laser disc, and typically ranges from 1 upto approximately 20. The fields Subtitle Number LSB and Subtitle Number MSB represent the least significant byte and the most significant byte of a particular subtitle number. Thus, fourteen bits of data are used for the Subtitle Number meaning that the Subtitle Number can range from 0 to 16,383. In this connection, it should be noted that generally, there is one subtitle for each line of dialog or several lines of dialog associated with a particular scene. Additionally, each language does not necessarily have the same number of lines of dialog since a more verbose language may require two or more subtitles to represent the same dialog as can be represented in a single subtitle in a less verbose language. However, such specific details do not form part of the invention, and the specific details relating thereto are not needed for a proper understanding of the invention.

Beginning Row For Subtitle represents a row from 0 to a number (MaxRow-1) which is one less than the row at which the subtitle information is to start where row 0 is the uppermost row which can be displayed and MaxRow-1 is the lowermost row which can be displayed. Similarly, Beginning Column for Subtitle represents a column from 0 to a number (MaxCol-1) which is one less than the column at which the subtitle information is to start where column 0 is the leftmost column which can be displayed and MaxCol-1 is the rightmost column which can be displayed.

Column Width is a number from 1 to MaxCol which represents the maximum number of columns which can be displayed containing subtitle information and Row Height is a number from 1 to MaxRow representing the maximum number of rows which can be displayed containing subtitle information. A typical value of MaxCol is 64 and a typical value of MaxRow is 16. However, these values may differ depending on the size and font to be displayed when the text data appears on the television or other monitor. Further, it should be recognized that all the information in the header record forms part of the files containing the text information from text source 11. In the preferred embodiment, there is one header record for each separate subtitle which is to be shown. The specific details concerning the relationships between lines of dialog, scenes and subtitles are decided in advance when the text input files are created and do not form part of the present invention.

Once a subcode pack with the system exclusive command has been specified, the rest of that subcode pack and subsequent subcode packs may be defined in any manner until an end of system exclusive command appears which is defined as "11110111" as shown in FIG. 4c. Using this scheme, a text encoded data entry may be defined (referring to FIG. 4b), in words 4 thru 19 of a subcode pack. This allows 12 seven bit characters to be represented in each subcode pack after the subcode pack containing the header record and before the last pack containing the end of system exclusive command.

By using the system exclusive MIDI format, inasmuch as only the first subcode pack contains the system exclusive command, and header information, and only the last pack contains the end of system exclusive command, excepting for the first and last packs, there are 96 bits available for data in each subcode pack.

However, due to a MIDI standard requirement concerning the storage of MIDI data in system exclusive messages that each 8 bit MIDI byte begin with a 0, it is necessary (assuming that the text is encoded as 8 bit ASCII bytes) to encode 8 bit ASCII bytes into a 7 bit field. This is accomplished by shifting each ASCII byte by one bit. For example, assuming that the 8 bits in the first byte are represented by A, the 8 bits in the second byte are represented by B, the eight bits in the third byte are represented by C and so on, if the ASCII data in a subcode pack formatted as shown in FIGS. 4a, 4b and 4c were extracted and placed in a column 8 bits wide, it would appear as follows:

| | |
|---|---|
| 11110000 | (System Exclusive) |
| 00000000 | (Manufacturer's ID) |
| 00000000 | |
| 00000001 | |
| 00100001 | (Subtitle Data Type) |
| 0LLLLLLL | (Language No. where LLLLLLL is 1 to No. of Languages) |
| 0SSSSSSS | (Subtitle No. LSB) |
| 0SSSSSSS | (Subtitle No. MSB) |
| 0RRRRRRR | (Beginning Row where RRRRRRR is 0 to MaxRow-1) |
| 0CCCCCCC | (Beginning Column where CCCCCCC is 0 to MaxCol-1) |
| 0WWWWWWW | (Column Width where WWWWWWW is 1 to MaxCol) |
| 0HHHHHHH | (Row Height where RRRRRRR is 1 to MaxRow) |
| 0AAAAAAA | (First Seven Bits of Byte 1 of Subtitle) |
| 0ABBBBBB | (Bit 8 of Byte 1 and First Six Bits of Byte 2) |
| 0BBCCCCC | (Bits 7-8 of Byte 2, Bits 1-5 of Byte 3) |
| 0CCCDDDD | (Bits 6-8 of Byte 3, Bits 1-4 of Byte 4) |
| 0DDDDEEE | (Bits 5-8 of Byte 4, Bits 1-3 of Byte 5) |
| 0EEEEEFF | (Bits 4-8 of Byte 5, Bits 1-2 of Byte 6) |
| 0FFFFFFG | (Bits 3-8 of Byte 6, Bit 1 of Byte 7) |
| 0GGGGGGG | (Bits 2-8 of Byte 7) |
| 0ZZZZZZZ | (End of Subtitle Content) |
| 11110111 | (End of System Exclusive) |

If the last MIDI byte before the System Exclusive is not completely filled, it should have trailing binary zeroes.

A suitable program 15a in C source code for executing in computer 15 to convert ASCII data from ASCII source 11 to suitable subcode data is attached hereto as Appendix 1. The embodiment shown in Appendix 1 uses an encoding scheme as shown in FIGS. 4a, 4b and 4c, with each language in a separate file 1-N which are interleaved such that contiguous subcode packs contain a subtitle header followed by one or more subcode packs containing the first subtitle for the first language, followed by a subtitle header, followed by one or more subcode packs containing the first subtitle for the second language, and so on for each language and for each subtitle.

The purpose of the program 15a is to place the ASCII data from source 11 into subcode pack format by adding the necessary mode, item and command entries, and determining and adding the six parity words.

Figure 5:
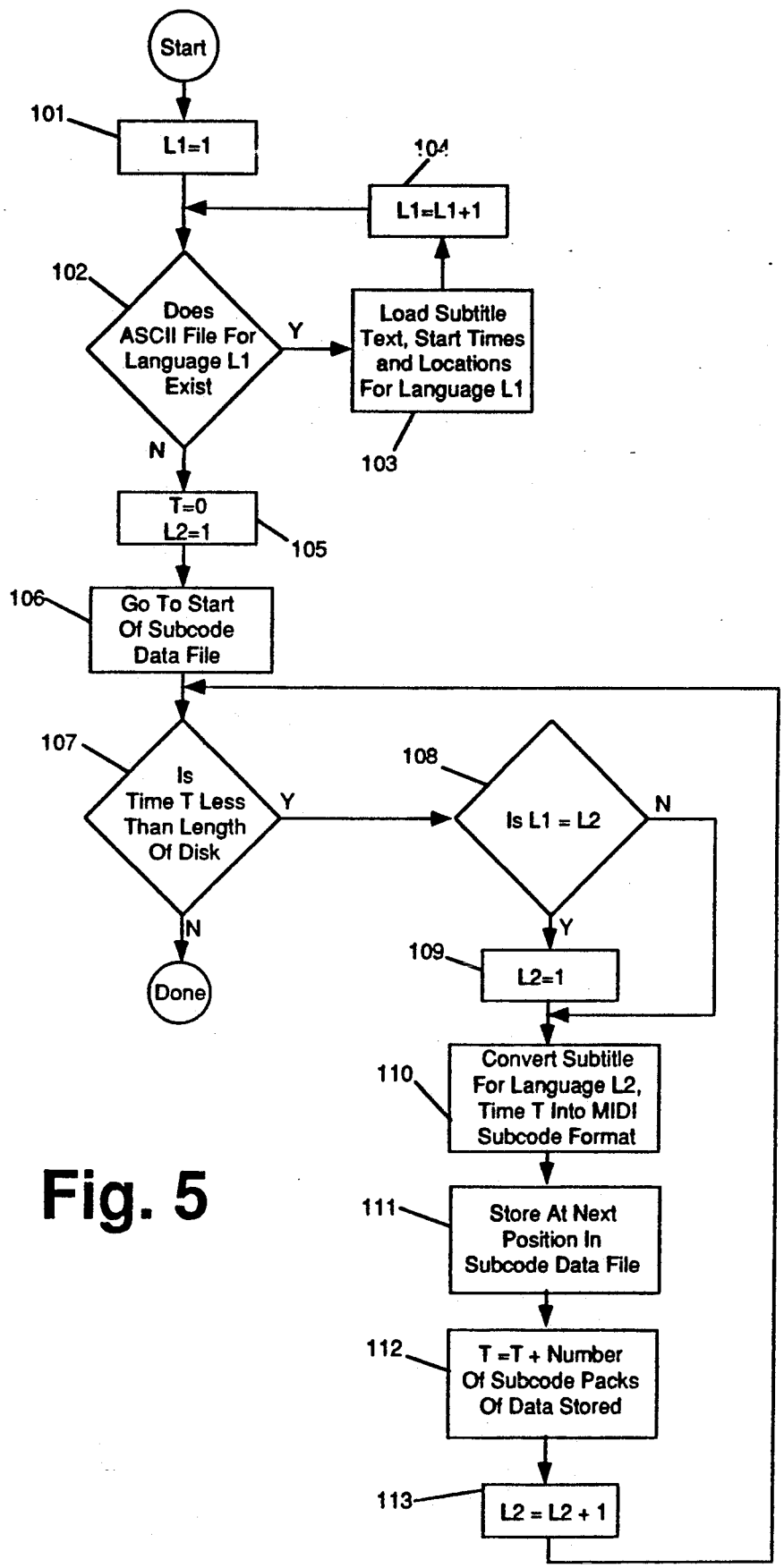
FIG. 5 shows a flow diagram of a computer program for converting raw text encoded data to subcode data.

A flow diagram showing the functions of computer program 15a executing in computer 15 which performs the encoding process and generates a subcode data disk 17 is shown in FIG. 5. The program starts at step 101 by initializing LANGUAGE COUNTER 1 (L1) to 1. Step 102 checks if a subtitle file exists in the current disk directory named, for example, SUBTx.ASC (where x=L1). The format of the data in each subtitle file is as follows:

```
<BEGINNING_ROW_1>,<BEGINNING_COLUMN_1>,<COLUMN_WIDTH_1>,<ROW_HEIGHT_1>
<START_TIME_1> (IN SMPTE TIME CODE FORMAT)
SUBTITLE TEXT LINE 1 FOR SUBTITLE 1
SUBTITLE TEXT LINE 2 FOR SUBTITLE 1
   .
   .
   .
SUBTITLE TEXT LINE <ROW_HEIGHT> FOR SUBTITLE 1
<BEGINNING_ROW_2>,<BEGINNING_COLUMN_2>,<COLUMN_WIDTH_2>,<ROW_HEIGHT_2>
<START_TIME_2> (IN SMPTE TIME CODE FORMAT)
SUBTITLE TEXT LINE 1 FOR SUBTITLE 2
SUBTITLE TEXT LINE 2 FOR SUBTITLE 2
```

-continued
SUBTITLE TEXT LINE <ROW_HEIGHT> FOR SUBTITLE 2

EXAMPLE:

| | |
|---|---|
| 12,1,64,2<br>00:00 | ←—SUBTITLE 1 |
| 12,1,64,2<br>00:45<br>Cowboy . . . what has<br>happened to your hair? | ←—SUBTITLE 2 |
| 12,1,64,2<br>00:50<br>Uh . . . um . . . I . . . I had it done. | ←—SUBTITLE 3 |
| 12,1,64,2<br>00:55<br>Uh, Clint Eastwood style. | ←—SUBTITLE 4 |
| 12,1,64,2<br>00:57<br>You see "Outlaw Josey Wales?"<br>What a flick. | ←—SUBTITLE 5 |

If the file exists, step 103 reads in the location, size, start time and text for each subtitle in the file, calculating the number of subtitles as each is read in, and stores such information in the encoding program's memory. LANGUAGE COUNTER 1 (L1) is then incremented in step 104, and the next language's subtitle file is searched for in step 2. This continues until no more subtitle files exist.

Step 105 then initializes SUBCODE DATA TIME (T) to 0, and LANGUAGE COUNTER 2 (L2) to 1. The subcode data file is opened in step 106, setting the current file position to the beginning of the file. SUBCODE DATA TIME (T) is compared to the end time of the disk to be produced in step 107, to see if the encoding process is complete.

If it is not, LANGUAGE COUNTER 2 (L2) is compared to LANGUAGE COUNTER 1 (L1) in step 108, and reset to 1 in step 109 if they are equal. This is so the subtitles will cycle back to the first language after the last. The correct subtitle data for the language specified by LANGUAGE COUNTER 2 (L2), at the time specified by SUBCODE DATA TIME (T) is then recovered from the encoding program's memory, and is converted into MIDI subcode format in step 110. Step 110 also generates the System Exclusive, Manufacturer's ID, Subtitle Data Type, and End of System Exclusive commands as shown in FIGS. 4a and 4c and calculates parity symbols for the current pack, i.e., calculates non-q ("p") parity and q parity according to the Red Book.

This subcode data is then written at the current file position in the subcode data file in step 111 according to the subcode pack layout as shown in FIGS. 4a, 4b and 4c, advancing the current file position to the end of the data written. The number of subcode data packs written is then added to SUBCODE DATA TIME (T) in step 112, so the time matches the position in the subcode data file. Lastly, in step 113, LANGUAGE COUNTER 2 (L2) is incremented to cycle through the languages, and the SUBCODE DATA TIME (T) is again compared to the end time of the disk in step 107. This continues until the entire subcode data file for the disk has been written. It should be noted that all the subtitle information written to subcode data disk 17 is obtained from text file 11 except for the fields Language Number, Subtitle Number LSB and Subtitle Number MSB. This information is generated by the above described computer program wherein Language Number is L1, and Subtitle Number LSB and Subtitle Number MSB are obtained from the number of subtitles counted in step 103.

A suitable program 19a in C source code and Microsoft Macro Assembler for executing in computer 19 to move subcode data from a file on hard or floppy disk 17 to the computer's random access memory (RAM) is attached hereto as Appendix 2. The data in RAM is then accessed by encoder interface logic 21 by direct memory access (DMA) and presented to compact disc encoder 23 as parallel electronic signals. Encoder 23 uses these signals in conjunction with video and main channel audio data from another source to cut the master for a laser disc with subcode data.

Figure 6:
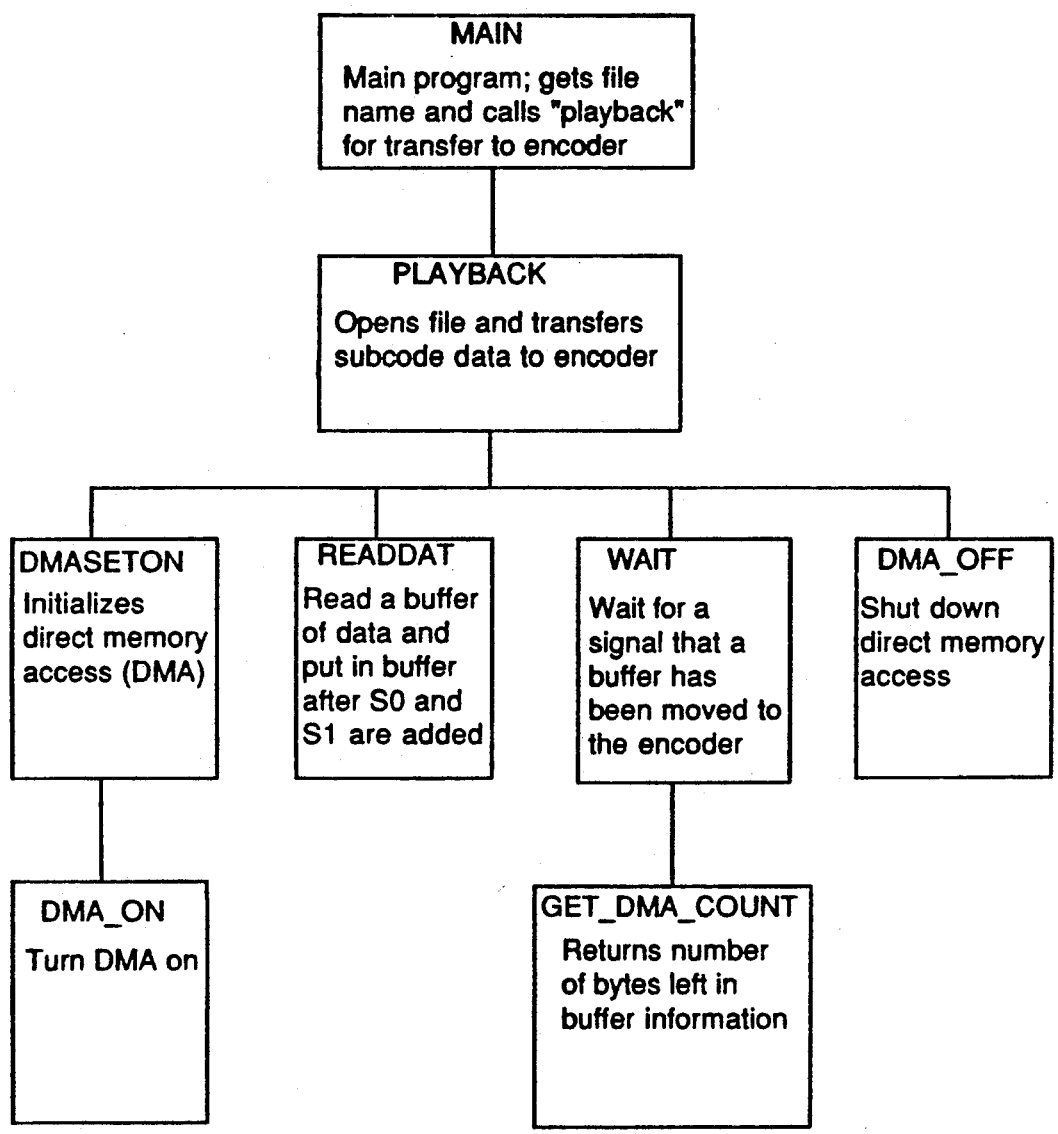
FIG. 6 is a hierarchical diagram of a computer program for reading subcode data stored on a floppy or hard disk to RAM for access by encoder interface logic 21.

A description of each of the routines of the program follows. A hierarchy chart which describes which function calls which sub-functions is shown in FIG. 6.

MAIN()

Requests and receives the file name for the subcode data on hard or floppy disk 17. It passes this name to the "playback" routine which actually handles the data transfer. Upon return, "main" requests another file name and repeats the operation until stopped by a "control C" or "control break".

PLAYBACK (FILENAME)

This routine opens the file of subcode data and returns if there is an error. If there is no error it invokes "dmaseton" which initializes encoder interface logic 21 to begin accessing and transferring data to encoder 23 when the board receives an electronic signal to do so. "Playback" then invokes "readdat" which reads data from the file, adds synchronization bytes according to the "Red Book" and moves the data to one of two data buffers in RAM. In the present embodiment of the program, each data buffer is 8134 bytes and is capable of holding 83 packets of subcode data. Another call to "readdat" is used to fill the second buffer, the "waitint" is called which waits for a signal from the encoder. When that signal is detected, "playback" calls "readdat" again to re-fill the first buffer and "waitint" to wait for a signal that the second buffer has been read and transferred. This process continues with data being read into one buffer while encoder interface logic 21 transfers data from the other buffer until all data from the file has been transferred. "Playback" invokes "dmaoff" to effectively shut down interface logic 21 activity, and closes the disk file containing subcode data and returns to "main".

READDAT (BUFNUM)

This routine is passed "bufnum" which indicates if the data should be transferred to the first or second buffer. "Readdat" begins by reading 83 packets worth of data from the subcode file on disk 17. Since the disk file does not contain sychronization bytes S0 and S1 (explained in the "red book"), there are only 96 bytes for each packet in the file. Thus, the program attempts to read 83×96 bytes=7968 bytes. If there are less than 7968 bytes left in the file, whatever data there is on the file is read in and binary zeroes are added to the end of the data to pad it out to 7698 bytes. If the read attempt detects no data (as in the read after a partial read), the program returns to "playback" with a status of end-of-file.

The data read from the file is moved packet by packet —96 bytes at a time—to the buffer area indicated by "bufnum". Before each move to the buffer, an S0 byte and an S1 byte are added before the 96 bytes of data read making a move of 98 bytes to the buffer. In this manner, the buffer contains all the S0 and S1 data needed for the encoder.

DMASETON()

Begins channel 1 DMA from 2C00:0 to 2C00:(83 * 98)d—wrap around mode. Calls "dma_on" to actually initialize initialize the DMA controller of computer 19 and set up the DMA channel.

DMA ON()

Sets up DMA channel 1 for 7.35 khz transfer of subcode bytes to encoder interface logic 21. The details for this may be found in the IBM PC Technical Reference Guide.

DMA_OFF()

Stops DMA on channel 1 (subcode) by setting ch 1 mask bit.

WAIT_INT()

Waits for a change in bit 15 of the DMA controller's output count register accessed using routine "get_dma_count" (indicating a buffer boundary crossing—end of buffer).

GET_DMA_COUNT()

Reads the contents of the remaining count register of DMA channel 1 and returns the count.

Figure 7:
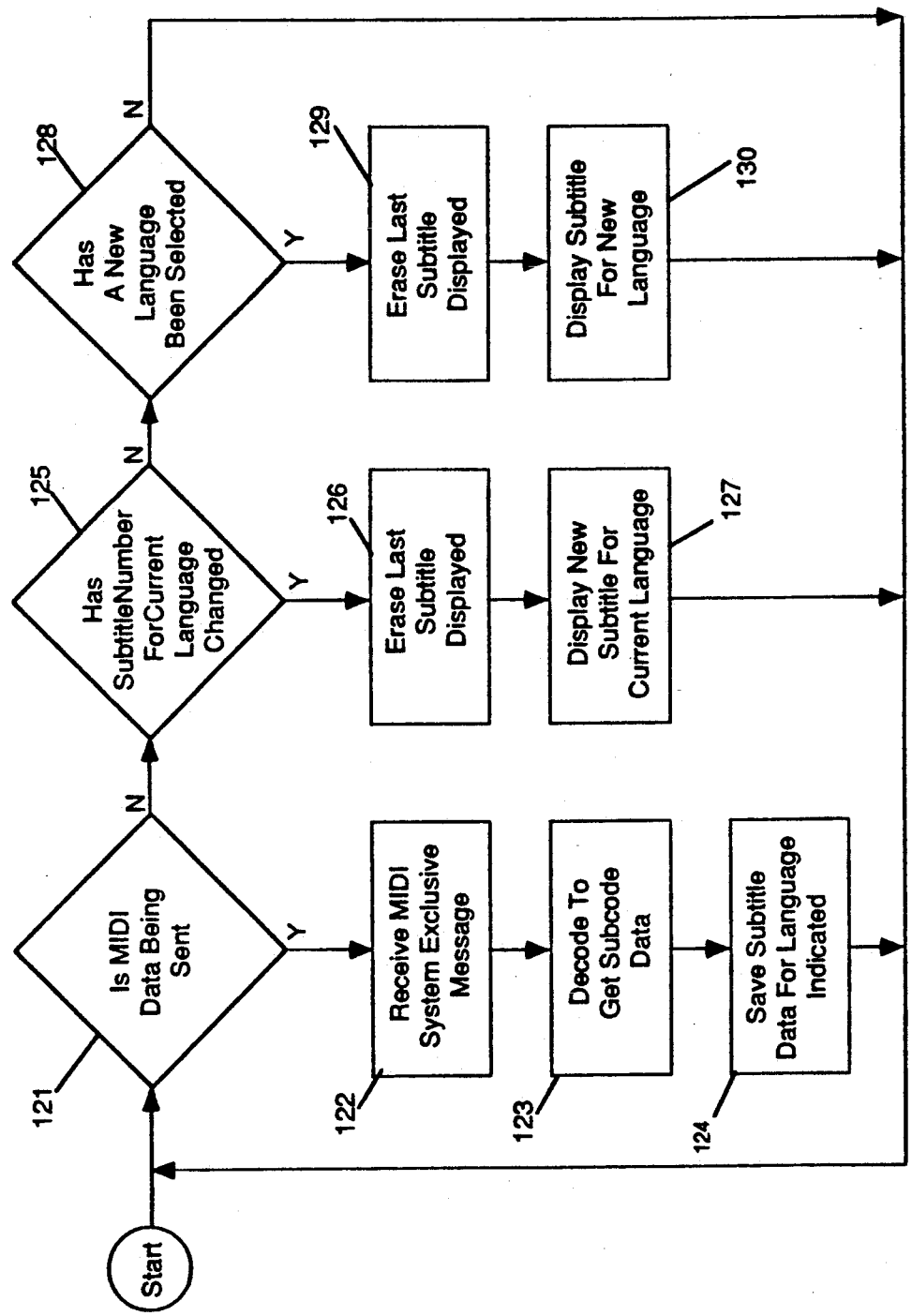
FIG. 7 shows a flow diagram of a computer program for reading data passed by decoder 29 and converting the data to text for display on a monitor or television screen.

The process for decoding the text information placed into the subchannel region for placement on television monitor or screen as subtitle information is also performed by a computer program 31 which in the preferred embodiment is stored in a ROM for execution by a microprocessor within laser disc player 27. However, specific implementation details for adding such a ROM and processor to a laser disc player do not form a part of the invention, are not needed for an understanding of the invention and therefore are described herein. Additionally, the specifics by which characters to be displayed are formed and displayed are well known in the art and are therefore not described herein. In this connection, the inventive features of program 31 are shown in FIG. 7, which program starts by checking if there is any MIDI data being sent by decoder 29 in step 121. If MIDI data is being sent, the MIDI system exclusive message is read in step 122, and decoded to extract the subtitle number, beginning row and column, column width, row height, text and language number in step 123. This subtitle data is then stored in a memory by program 31 at a different location for each language in step 124. Processing then returns to step 121.

When not busy reading MIDI data, e.g., before a System Exclusive has been received, or after an End of System Exclusive has been received, step 125 checks if the subtitle number of the most recent MIDI data sent has changed, for the current language being displayed. If it has, the last subtitle displayed is erased in step 126, and the new subtitle is displayed in step 127. Processing then returns to step 121.

When no MIDI data is being sent, and the subtitle number has not changed for the current language, step 128 checks if a new language has been selected by an input generated by a user, for example, by pressing a button on a remote control unit which generates a signal interpreted by program 31 as a request to change language. If one has, the last subtitle displayed is erased in step 129, and the current subtitle for the new language is displayed in step 130. Processing then returns to step 121.

APPENDIX 1

```
include <stdio.h> include <stdlib.h> include <fcntl.h> include <io.h> include <sys\types.h> include <sys\stat.h> include <string.h> include <ctype.h> define CR 13 define CTL_Z 26
```

```c
#ifndef FALSE
#define FALSE  0
#define TRUE   (!(FALSE))
#endif

/* return values */
#define OK 0
#define UNEXPECTED_EOF (-5)

#define NEWHEADER 2

/* misc defines */
#define FILE_NAME_LEN      80

/* packs, header sizes, etc. */
#define PACK_SIZE  24           /* number of bytes in a pack */
#define MENU_PACKS 96           /* number of packs in a menu (and transp) */
#define FRAME_PACKS    10       /* number of packs in a video frame */
define SEC_FRAMES     30       /* number of frames in a second */ define FRAME_SIZE  (FRAME_PACKS * PACK_SIZE)

/* number of bytes in a big file for one second of data */
#define SEC_BYTES ( SEC_FRAMES * FRAME_PACKS * PACK_SIZE)    /* 7200 */
/* size in bytes of the big file. This value is used to
 * determine how many copies of the final subtitle text to
 * write. (Will write to the end of the existing big file )
 */
long totbigbytes;

#define HEADER_NUM_VALS 4
typedef struct
{ int val[ HEADER_NUM_VALS ]; }
        HEADER;

#define SYSEX (0xF0)
#define EOSYSEX (0xF7)

#define MAX_SUBT_COLS 64   /* max cols for a subtitle */
#define MAX_SUBT_ROWS 16   /* max rows for a subtitle */

/* max size needed to buffer one subtitle */
```

```c
#define MAX_SUBT_BUF ((MAX_SUBT_COLS+2) * MAX_SUBT_ROWS )
unsigned char sbuf[ MAX_SUBT_BUF ];

#define NUMLANGS 6
unsigned char prev_subtitle[ NUMLANGS ][ MAX_SUBT_BUF ];

#define MAX_MIDI_BYTES (12 + MAX_SUBT_BUF )
unsigned char midibuf[ MAX_MIDI_BYTES ];

/* 2 packs for first 12 bytes (10 per pack) which is midi sysex, etc. */
/* then 1 pack for every ten possible bytes in the subtitle text */
#define MAX_PACKS ( 2 + (MAX_SUBT_BUF / 10 ))

int numpacks[ NUMLANGS ]; /* number of packs used in each language */
HEADER headers[ NUMLANGS ];
/* offset into big file to start and end the current subtitle text */
/* for now, use one time for all languages. (take time from subtX1.asc) */
long start_byte = 0L;
long end_byte = 0L;

/* number of bytes to subtract from each start/end time */
long offset_bytes = 0;

/* sub channel packs, data for big file */
char scp[ NUMLANGS ][ MAX_PACKS ][ PACK_SIZE ];

#define MAXLINE 120
char linebuf[ MAXLINE ];

int bigid = -1;    /* big file handle */
char zerobuf[ PACK_SIZE ];

/* parity & interleaving data space */
static unsigned antilog[64];
static unsigned mul6[64];
static unsigned mul21[64];
static unsigned mul39[64];
static unsigned mul18[64];
static unsigned mul1[64];
static int log[64];
```

```c
extern int errno;

long intobyte( int, int);
unsigned mult1();
unsigned mult();

/* shorhand for exclusive oring */
#define uxor(a,b)  ( (a) ^ (b) )

main()
{
        zero_pack( zerobuf );
        inits();

par_init();
        doit();
        if ( bigid >= 0 )
                close (bigid);

/*
        merge_menus();
        */
} /* main() */

/*........................................................ */
doit( )
{
        int done;
        int curlang;
        int retval;
        int newheader[NUMLANGS];
        register int i;

for ( i = 0; i < NUMLANGS; i++)
                newheader[i] = FALSE;

/* encode 4 numbers on first line into one byte integers */
        get_header( headers, -1 );
        done = FALSE;
        while ( !done )
        {
```

```
for ( curlang = 0; curlang < NUMLANGS; curlang++ )
{
                        /* note: get_subtitle should get next start time too */
                        if (( retval = get_subtitle( curlang )) == NEWHEADER )
                                newheader[ curlang ] = TRUE;

else if ( retval == EOF && curlang == 0 )
                                done = TRUE; .

else if ( retval == UNEXPECTED_EOF )
                        { sprintf(linebuf, "Unexpected eof in subtitle file: lang: %d.\n",
                                curlang);
                                endit( linebuf );
                        } /* else */
                /* convert it into midi block, then into it's scp (subchannel packs) */
                        convert_subtitle( curlang );
                } /* for to numlangs */

/* dump this subtitle to the big file */
                dump_it( );

} /* while not done */
} /* doit() */

/**********************************************************/
/* initialize: open appropriate files. fill appropriate
 * buffers.
 */
inits()
{
        extern long newbig();
        long pos;
        register int i;
        int num_read;

io_inits( );
        midi_buf_init( midibuf );

/* open big file */
        totbigbytes = (long ) newbig( 'A' );

} /* inits() */
```

```
/*
 * close current big file and open new one
 */
long
newbig( char bigchar )
{
char bigfilename[13];
int numsecs;
int i, j;

if ( bigid >= 0 )
                close( bigid );

if ( bigchar != 'A' )
                sprintf( bigfilename, "big%c", bigchar);
        else
                strcpy( bigfilename, "big");

if ( (bigid = open( bigfilename, O_WRONLY | O_BINARY)) < 0)
        {
                        fprintf( stderr,
"Error opening big file. (correct size big file must exist)  (%d)\n(%s)\n",
                                errno, bigfilename);
                        exit( 1 );
        } /* if open failed */ return filelength( bigid );

} /* newbig() */

/* zero 24 bytes at pack */
zero_pack( char * pack )
{
        register int i;
        register char *ptr;

for ( i = 0, ptr = pack;
                                i < 24;
                                i++, ++ptr )
                *ptr = '\0';
} /* zero_pack() */
```

```c
static FILE *stfp[ NUMLANGS ]; /* subtitle file pointers */

/* get next header */
/* if offset < 0, get headers from each of numlangs files. If offset
 * >= 0, just get header into hdr[ offset ] from file stfp[ offset ]
 */ get_header( hdr, offset )
HEADER *hdr;
int offset;
{
        register int i;
        int first, last;
        int min, sec;
        static int first_time = TRUE;

/* arguments */
        if ( offset < 0 )
                { first = 0; last = NUMLANGS; }
        else
                first = last = offset;

/* make sure there's an open file */
if ( stfp[ first ] == NULL )
{
        /* note: subtX1.asc must exist. 2-4 or optional. (time taken from 1) */
        /* if not, or end of file, open the next available (subtan-subtzn.asc)
         * ( n=1,4 ) four files. (and of course close the current )
         */
        next_subtitle_files( );
}

/* and get the header values */
for ( i = first; i < last; i++ )
{
        if ( stfp[ i ] != NULL )
        {
                if ( fgets( linebuf, MAXLINE, stfp[ i ] ) == NULL )
                {
                        fprintf( stderr,
                        "Error. Expected header in subtitle file for lang %d. err %d\n",
                        i+1, errno);
                        fclose( stfp[ i ] );
```

```
                stfp[ i ] = NULL;
        } /* fgets failed */
        else
        {
                if ( sscanf( linebuf, "%d,%d,%d,%d",
                        &hdr[i].val[0], &hdr[i].val[1],
                        &hdr[i].val[2], &hdr[i].val[3]) != 4 )
                        tokenize_header( linebuf, hdr+i );
        } /* else fgets successful */
        if ( fgets( linebuf, MAXLINE, stfp[ i ] ) == NULL )
        {
                fprintf( stderr,
        "Error. Expected start time in subtitle file for lang %d. err '%d'\n",
                        i+1, errno);
                fclose( stfp[ i ] );
                        stfp[ i ] = NULL;
        } /* fgets failed */
        else if ( i == 0 ) /* only use start time from first language */
        {
                min = atoi( linebuf );
                sec = atoi( linebuf+3 );
                start_byte = tmtobyte( min, sec );
                if ( first_time )
                { offset_bytes = start_byte; start_byte = 0; first_time = FALSE; }
        } /* else if i is 0 */
    } /* if file ptr not null */

} /* for i to numlangs */
} /* get_header() */ io_inits( )
{
        register int i;

for ( i=0; i < NUMLANGS; i++)
                stfp[ i ] = NULL;

} /* io_inits() */ char *breaks = " ,;\t";
```

```c
tokenize_header( str, hdr )
char * str;
HEADER *hdr;
{
        char *tmp;
        register int i;

tmp = strtok( str, breaks );
        for ( i=0; i < 4; i++)
        {
                if ( tmp == NULL )
                        break;
                hdr->val[i] = atoi( tmp );
                tmp = strtok( NULL, breaks );
        }
} midi_buf_init( char * mbuf )
{
        register int i;

for ( i = 0; i < MAX_MIDI_BYTES; i++)
                midibuf[i] = 0;

/* set midi block to
                        byte 1: sysex (midi),*/
        mbuf[0] = SYSEX;
                        /*byte 2, 3, 4: manufid,*/
        mbuf[1] = 0x00;
        mbuf[2] = 0x00;
        mbuf[3] = 0x01;

/*byte 5: Data type (0x21)*/
        mbuf[4] = 0x21;

/*byte 6: Language code (1, 2, 3, or 4, based on file name)*/
        mbuf[ 5 ] = 1;  /* first done will be lang 1 */

/*byte 7: 2 7 bit bytes: least sig seven bits first of
                byte 8: most sig seven bits of ordinal value of this subtitle */ mbuf[ 6 ] = 0x01;
        mbuf[ 7 ] = 0x00;
```

```
/* byte 9,10,11,12:
    byte : 4 header values (as above)

(fourth is number of text lines, should be 2 )
*/

} /* midi_buf_init() */

/* following is mainly midi block formatting notes */
    /* set midi block to
        byte 1: sysex (midi),
        byte 2, 3, 4: manufid,
        byte 5: Data type (0x21)
        byte 6: Language code (1, 2, 3, or 4, based on file name)
        byte 7: 2 7 bit bytes: least sig seven bits first of
        byte 8: most sig seven bits of ordinal value of this subtitle byte 9,10,11,12:
        byte : 4 header values (as above)

(fourth is number of text lines, should be 2 )
    */

/* following is mainly scp formatting */
    /* change midi byte 7 and 8 (increment one) -- */

/* read the start time and subtitle text */
    /* replace 0d0a sequences with 0d (CR) */

/* Do an ascii to midi shift of text into midi block
     * starting at 13th byte (follows 4 header values in ) */

/* Finally end midi block with EOSYSEX (0xF7 )
        (replace the last 0D with EOSYSEX
    */

/* Initialize packs, one at a time with  (old format)
        byte 0: MIDI 0x3D  ( not (0x18))
        byte 1: 0x15 (not number of midi bytes in pack (10 or 12 max?))
        byte 2
        byte 3: Q parity
packs[0][0] = 0x3D; (
packs[0][1] = 0x15;
```

```
        packs[0][17] = 0x09;
                        byte 17, number of midi bytes in pack 0x00 to 0x0A.

Do midi to subchannel shift for midi block into packs
                        starting at byte 4 (fifth).

*/ static int stcount[ NUMLANGS ];

get_subtitle( lang )
int lang; /* offset (0..3) of language number */
{
        register int i;
        char *ptr;
        int min;
        int sec;
        int c;

if ( lang == 0 && end_byte != 0L )
                start_byte = end_byte;
        if ( stfp[ lang ] == NULL )
                return EOF;
        ptr = &sbuf[0]; /* point to subtitle file buffer */
        for ( i = 0; i < headers[ lang ].val[ 3 ]; i++ )
        {
                if ((( fgets( ptr, MAX_SUBT_COLS+2, stfp[ lang ])) == NULL)
                        return UNEXPECTED_EOF;
                /* now find 0x0d (eoln) */
                while ( *ptr != CR && *ptr != '\0' )
                        ptr++;
                if ( *ptr == '\0')
                        *ptr = CR;
                ptr++;
        } /* for to val3 (numlines) */
        *ptr = '\0';
        /* now get end_time */
        if ((( fgets( linebuf, MAXLINE, stfp[ lang ])) == NULL)
                return EOF;
        /*if ( linebuf[0] == '~' )
                return NEWHEADER;
        */
```

```
    if ( linebuf[0] == CTL_Z )
    {
        return EOF;
    } if ( !isdigit( linebuf[0] ) )
    { fprintf(stderr,
            "get_subtitle: bad minute time in language %d.\n(this subtitle will be the last, %d)\n", lang, stcount[ lang ]);
        return EOF;
    } if ( !isdigit( linebuf[3] ))
    { fprintf(stderr,
            "get_subtitle: bad second time in language %d.\n(this subtitle will be the last, %d)\n", lang, stcount[ lang ]);
        return EOF;
    } min = atoi( linebuf );
    sec = atoi( linebuf+3 );
    end_byte = tmtobyte( min, sec ) - offset_bytes;

/* now check for newheader flag */
/*  if (( c = getc( stfp[ lang ] ) == '~'))
        { fgets( linebuf, MAXLINE, stfp[ lang ]);
            return NEWHEADER;
        }
        else
            ungetc( c, stfp[ lang ] );
*/ return OK;
} /* get_subtitle() */

/*************************************************************/
/* convert time (format: mmss) into bytes
 * (SEC_BYTES bytes per second. (7200))
 */
long
tmtobyte( min, sec )
```

```
int min, sec;
{
        long totsecs;
        long tmp;

tmp = (long) min * 60;
        tmp = tmp + sec;
        tmp = tmp * SEC_BYTES;
        return tmp;
}

/* convert ascii subtitle buffer into a midi block */
/* then convert the midi block into subchannel packs */ convert_subtitle( lang )
int lang;
{
static int first_time = TRUE;
        register int i;
        int midibytes;  /* total number of midibytes in the midibuf */
        int count;      /* number of midibytes needed for the subtitle text */
        /* number of midibytes left to shift into packs */
        int bytes_left;
        int numbytes;   /* number of midibytes shifted into thispack */
        unsigned char *thispack;

/* initialize subtitle count array */
        if ( first_time )
        {
                for ( i=0; i< NUMLANGS; i++)
                        stcount[ i ] = 0;

first_time = FALSE;
        } midi_buf_init( midibuf );
        /* convert ascii subtitle buffer into a midi block */
        midibuf[ 5 ] = lang+1;
        if ( strcmp( sbuf, prev_subtitle[ lang ] ) != 0 )
                ++stcount[ lang ];

strcpy( prev_subtitle[ lang ], sbuf );
```

```c
if ( stcount[ lang ] == ( pow( 2, 13 ) -1 ) )
        fprintf( stderr, "Too many subtitles to count. language %d.\n", lang);

midibuf[ 6 ] = (char) (stcount[ lang ] & 0x007F);
midibuf[ 7 ] = (char) ((stcount[ lang ] & 0x3F80) >> 7);
for ( i = 0; i < HEADER_NUM_VALS; i++)
        midibuf[ i+8 ] = (char) (headers[ lang ].val[ i ]) ;

/* shift the ascii data into midi block (1 bit to the right,
 * so as to leave high order bit of each byte 0)
 * dest, src, count */
count = asc_to_midi_shift( midibuf+12, sbuf, strlen(sbuf) );

/* now shift into subchannel packs, <= 10 bytes per pack */
midibytes = 12 + count;
midibuf[ midibytes ] = EOSYSEX;
midibytes++;

bytes_left = midibytes;
/* packs = bytes / 10  (+ 1 if any bytes left.) */
numpacks[ lang ] = 0;
/* midibytes / 10 + ( midibytes % 10 > 0 ? 1 : 0 ); */

/* for ( i = 0; i < numpacks[ lang ]; i++ ) */
while ( bytes_left )
{
        thispack = scp[ lang ][ numpacks[ lang ]];
        zero_pack( thispack );
        numbytes = min( 10, bytes_left );

midi_sub_shft( thispack + 4, midibuf + (midibytes-bytes_left),
                numbytes );
        thispack[ 17 ] |= numbytes;
        thispack[ 0 ] = 0x3D;
        thispack[ 1 ] = 0x15;

calpar( thispack, 0 );
        calqpar( thispack );

bytes_left -= numbytes;

numpacks[ lang ] ++;
} /* while bytes left */
```

```
        /*numpacks[ lang ]--;*/
} /* convert_subtitle() */ next_subtitle_files( )
{
        /* note: subtX1.asc must exist. 2-4 or optional. (time taken from 1) */
        /* if not, or end of file, open the next available (subtan-subtzn.asc)
         * ( n=1,4 ) four files. (and of course close the current )
         */
        register int i;
        char fname[ 13 ];

for ( i=0; i < NUMLANGS; i++)
        {
                sprintf( fname, "subta%.1d.asc", i+1 );
                stfp[i] = fopen( fname, "r+b" );

} /* for i to numlangs */
} /* next_subtitle_files() */ endit( msg )
char *msg;
{
        register int i;

for ( i=0; i < NUMLANGS; i++)
                if (stfp[i] != NULL)
                        fclose( stfp[i] );

if ( bigid >= 0 )
                close( bigid );
        fprintf( stderr, "%s", msg);
        exit(-1);

} /* endit() */

/* midi_sub_shft.( char *dest, char *src, int count ) */
/* take count midi bytes from src, shift appropriately to
 * fit into the subchannel packs at dest, and transfer.
 * ( note dest should point to the first byte in the pack
 * THAT IS TO RECEIVE midi data. NOT the very first byte in
 * the pack. Normally it will be the fifth byte in the pack)
```

```c
*/
midi_sub_shft( char *dest, char *src, int count )
{
        int numdone = 0;
        char *last;
        last = src + count - 1;

do
        {
                /* put high order 6 bits of src byte into dest */
                *dest = ( ((*src) >> 2 ) & (~0xC0));
                dest++;

/* if there's more to be taken, concatenate low order 2
                 * to high order 4 of next.
                 */
                if ( src < last )
                        *dest = (((*src << 4) & 0x30) | ( 0x0F & *(src+1) >> 4));

/* otherwise, just use low order 2 of current byte */
                else
                {
                        *dest = (((*src << 4) & 0x30) );
                        return;
                }
                src ++;
                dest ++;

if ( src < last )
                        *dest = ( ((*src << 2) & 0x3C) | ( (*(src+1) >> 6) & 0x03));
                else
                {
                        *dest = ( ((*src << 2) & 0x3C) );
                        return;
                }
                dest ++;
                src ++;
                *dest = 0x3F & *src;
                dest ++;
                src ++;
        } while ( src <= last);

} /* midi_sub_shft */
```

```c
/*
** dest, src, count */
/* return number of midi bytes used */
/*asc_to_midi_shift( midibuf+12, sbuf, strlen(sbuf) );*/
asc_to_midi_shift( dest, src, count )
unsigned char *dest;
unsigned char *src;
int count;
{
        register int i;
        char *last;
        char *first_dest;

last = src + count - 1;
        first_dest = dest;
        while ( TRUE )
        for ( i=0; i < 8; i++ )
        {
                if ( src > last )
                {
                        if ( i != 0 )
                                *dest = getbits( *(src-1), i-1, i ) << (7-i) ;

count = ( dest - first_dest + 1 );
                        return count;
                }
                if ( i == 0 )
                {
                        *dest = getbits( *src, 7, 7 ) ;
                        src++;
                }
                else if ( i == 7 )
                {
                        *dest = getbits( *(src-1), 6, 7 );
                }
                else
                {
                        *dest = ( getbits( *(src-1), i-1, i ) << (7-i) )
                                                | ( getbits( *src, 7, 7-i ) );
                        src++;
                }
                dest++;
```

```
        } /* for i to 7 */
} /* asc_to_midi_shift() */

/* get n bits from position p */
/* p = 0 for rightmost bit.  K&R, p.45 */
getbits( x, p, n)
unsigned x, p, n;
{
        return ((x >> (p+1-n)) & ~(~0 << n));
} dump_it( )
{
        long bigpos;
        register int curlang, j;

if ( start_byte == end_byte )
                end_byte = totbigbytes;

/* seek to begin time */
        if ((bigpos = lseek( bigid, start_byte, SEEK_SET)) == -1L)
        {
                fprintf(stderr,
                        "lseek to start_byte in big failed. (errno %d, offset %ld)\n",
                        errno, start_byte );
                endit("");
        } while ( TRUE )
        {
                for ( curlang = 0; curlang < NUMLANGS; curlang++ )
                {
                        if ( bigpos <= end_byte - (numpacks[ curlang ] * PACK_SIZE) )
                        {
                                for ( j=0; j < numpacks[ curlang ]; j++ )
                                {
                                        put_pack( bigid, scp[ curlang ][ j ]);
                                        bigpos += PACK_SIZE;
                                }
                        } /* if bigpos says space left */
```

```
                else
                        return;
                } /* for to NUMLANGS */
        } /* while true */
} /* dump_it() */

/*******************************************************************/
/*
 * write a pack (24 bytes) of data from buffer to
 * file handle at current position.
 * if buff is NULL, write zeros.
 */
put_pack( fh, buff)
int fh;
char *buff;
{
        int numwrote;
        int totwrote;
        int i;
        char zerochar;

if ( buff == NULL )
                buff = &zerobuf[0];

if ((numwrote = write( fh, buff, PACK_SIZE )) != PACK_SIZE)
        {
                fprintf(stderr,
        "put_pack: write to file failed. (errno %d, byteswrote %d)\n",
                        errno, numwrote );
                exit( 1 );
        }
} /* put_pack() */ par_init()
{
  int m,n;

antilog[0]=1;
  for (n=1; n<=63; n++)
     antilog[n] = mult1(antilog[n-1]);

for (m=0; m<=62; m++) {
     n = antilog[m];
     log[n] = m;
```

```
    }
    log[0] = 255;
    for (n=0; n<=63; n++) {
        mul6[n] = mult(n,3);
        mul21[n] = mult(n,59);
        mul39[n] = mult(n,54);
        mul18[n] = mult(n,15);
        mul1[n] = mult(n,2);
    }
} unsigned mult1(p)
unsigned p;
{
    unsigned q;

q = p + p;
    if (q > 63) {
        q = q - 64;
        q = uxor(q,3);
    }
    return(q);
} unsigned mult(p,q)
unsigned p,q;
{
    unsigned z;
    int pp,qq,zz;

if ( (p==0) || (q==0) )

z = 0;
    else {
        zz = log[p] + log[q];
        if (zz > 62) zz = zz-63;
        z = antilog[zz];
    }
    return(z);
}
```

```
calpar( workbuff, work24 )
char *workbuff;
int work24;
{
   int n;
   unsigned a[4]; /* contains 4 parity symbols */
   unsigned z;

for (n=0; n<=3; n++) a[n]=0;
   for (n=0; n<=19; n++) {
      z = uxor(a[0],workbuff[work24 + n]);
      a[0] = uxor(mul18[z],a[1]);
      a[1] = uxor(mul39[z],a[2]);
      a[2] = uxor(mul21[z],a[3]);
      a[3] = mul6[z];
   }
   for (n=0; n<=3; n++)
      workbuff[n+20+work24] = a[n];

}

/* calqpar - do the q parity symbols */
calqpar( char * in_data )
{
   int n;
   unsigned a[2]; /* will contain the 2 parity symbols*/
   unsigned z;

for (n=0; n<=1; n++)
      a[n]=0;
   for (n=0; n<=1; n++) {
      z = uxor(a[0],in_data[ n ]);
      a[0]=uxor( mul6[z], a[1] );
      a[1]=mul1[z];
   }
   for (n=0; n<=1; n++)
      in_data[ n+2 ]=a[n];

}
```

APPENDIX 2

```c
define READNT 0x8000 char filename[ 80 ];

char pbuffer[ 16384 ];

main()
{
while( 1 )
{
printf("\nFile to playback:" );
gets( filename );

playback( filename );
}

}
/******************************************************/ define BUFFER1 0x2c00
define BUFFER2 0x2dfc

/*
#define BUFFER1 0x3000
#define BUFFER2 0x31fc
*/ define S0 0xc0
define S1 0x80 playback(name)
char *name;
{
char z, i, stime[10];
long packs, delay, orig, origs, origb, distance, header = 0L;
/*int inthnd();*/
int filout, wipei, status, flag=1;

if ((filout = open(name    , READNT)) == -1)
```

```c
    {ioerr("opening"); return;}

/* skip 1st 4 bytes */
if ((status = read(filout,pbuffer, 48)) < 0)
        {ioerr("reading length"); return;} if ((status = readdat(1, filout, 1)) < 0)
        {ioerr("reading 1st 1"); return;}
if (status != 0)
    if ((status = readdat(2, filout, 0)) < 0)
        {ioerr("reading 1st 2"); return;} printf("TO EXIT PLAYBACK PRESS Ctrl.");

/*  wrk 11/20/87
for (wipei = 0; wipei < 96 * 83; wipei++)
  pbuffer[wipei] = 0;

poke(BUFFER1, 0, pbuffer, 96 * 83);
poke(BUFFER2, 6, pbuffer, 96 * 83);
*/
  if((i = key()) == 4)
  {
        if ((status = close(filout)) < 0) ioerr("closing");
                return;
  } delay = 0L;

orig = delay; origs = delay + 126000l - 664l; origb = delay + 1332000l - 664l;
dmaseton();

if (status != 0)
{
while (1)
{
  if((i = key()) == 4)
            break;
   WAIT_INT();

if ((status = readdat(1, filout, 0)) < 0)
        {ioerr("reading 1"); return;}
```

```
        if (status == 0)
                break;

if((i = key()) == 4)
                break;
    WAIT_INT();
    if ((status = readdat(2, filout, 0)) < 0)
                {ioerr("reading 2"); return;}
    if (status == 0)
                break;

}
}
WAIT_INT();

DMA_OFF();

if ((status = close(filout)) < 0) {ioerr("closing"); return;}

}

/*****************************************************************/ readdat(bufnum, filout, skipread)
int bufnum, filout, skipread;
{
int i, status;
unsigned offset, offsetl, segment, readidx;

struct SET
{
        char s0byte;
        char s1byte;
        char data96[98];
};

struct SET set1;

char *set1pt;
char *readpt;
char *topt;
```

```
if (bufnum == 1)
{
        segment = BUFFER1;
        offsetl = 0;
}
else
{
        segment = BUFFER2;
        offsetl = 6;
} set1.s0byte = S0;
set1.s1byte = S1;

set1pt = &set1.s0byte;

offset = offsetl;

if( skipread )
{ status = 0;

}
else
{
        if ((status = read(filout,pbuffer, 96 * 83)) < 0)
                                                return(status);

} for( readidx = 0; readidx < status; readidx++ )
        if( pbuffer[ readidx ] == 0xff )
                pbuffer[ readidx ] = 0;

if( ( status < 96 * 83 ) && ( status > -1 ))
        for( readidx = status; readidx < 96 * 83; readidx++ )
                pbuffer[ readidx ] = 0;

for (readidx = 0; readidx < 96 * 83; readidx += 96)
{
        readpt = &pbuffer[readidx];
```

```
        topt = &set1.data96[0];
        movmem(readpt, topt, 96);
        set1pt = &set1.s0byte;
        poke(segment, offset, set1pt, 98);
        offset += 98;
    }
    if( skipread )
    return(1);
    else
    return( status );
}

/*****************************************************************/
ioerr(c)

char *c;
{
printf("\nSorry, there was an error %s the file.",c);
}
/*****************************************************************/
```

TITLE ************** R..W DMA INTERFACE TEST PROGRAM   10/23/84 
;
;
;
;

DATA SEGMENT WORD 'DATA'
;
;
;
;

DATA ENDS
;
;
PAGE, 132
;
;
. DMA  EQU  0            ;DMA CONTROLLER IS AT IO PORT 0.

;
;DMABUF EQU 03000H

```
DMABUF   EQU 02C00H
;
;
pgroup   group prog
prog     segment byte public 'PROG'
         assume cs:pgroup
;
```

;••••••••••••••••••••••••••••••••••••••••••••••••••••••••••••••••••
; begins ch 1 dma from 2c00:0 to 2c00:(83 * 98)d - wrap around mode.

```
dmaseton  proc near
          public dmaseton
            push bp
            push es
            mov bx, DMABUF
            mov es,bx
            mov bx,0
            mov cx, 83 * 98 * 2   ; 2 buffers of 83*98 each.
            call DMA_ON
            pop es
            pop bp
            ret
dmaseton  endp
```
;
;
;
;
;
;•••••••••  DMA CONTROL SOFTWARE  •••••••••••••••••••••••••••••••••
;
;CONTAINS PROCEDURES TO INITIALIZE DMA CONTROLLER CH 1 FOR OUTPUT TO THE
;R..W DECODER INTERFACE BOARD, STOP DMA OUTPUT AND WAIT FOR CURRENT PLAYBACK
;BUFFER TO EMPTY.
;
;
;
;————————————————————————————————
;DMA_ON
; SETS UP DMA CHANNEL 1 FOR 7.35 KHZ TRANSFER OF VIDEO SUBCODE BYTES TO
; R..W DECODER INTERFACE BOARD.
; MODELED AFTER PROC DMA_SETUP IN BIOS FLOPPY DISK CODE.

```
; INPUT: ES:BX HAS STARTING ADDRESS OF OUTPUT BUFFER AREA.
;       CX HAS LENGTH OF OUTPUT BUFFER AREA.
; OUTPUT: DMA CONTROLLER IS INITIALIZED AND DMA IS STARTED.
;       AUTO INIT MODE RELOADS STARTING ADDRESS WHEN COUNT IS 0.

;_____
;
DMA_ON  PROC NEAR
        public DMA_ON
        PUSH CX             ;SAVE BUFFER SIZE
        CLI
        OUT DMA+12, AL      ;SET FIRST BYTE FF.
        PUSH AX             ;DELAY
        POP AX
        MOV AL, 59H         ;MODE BYTE. CH=1,READ.AUTO.INC.SINGLE.
        OUT DMA+11, AL
        MOV AX, ES          ;ADDRESS SEGMENT
        MOV CL, 4
        ROL AX, CL
        MOV CH, AL          ;HIGH NIBBLE OF ES TO CH
        AND AL, 0F0H        ;SEG LOW NIBB = 0
        ADD AX, BX
        JNC J333
        INC CH
J333:
        OUT DMA+2, AL       ;START ADDRESS LOW BYTE
        MOV AL, AH
        OUT DMA+2, AL       ;SEND HIGH BYTE
        MOV AL, CH          ; PAGE REGISTER BITS
        AND AL, 0FH
        OUT 83H, AL         ;SEND TO PAGE REGISTER.
        POP CX              ; GET BACK BUFFER SIZE
        DEC CX              ; ONE LESS
        MOV AX, CX          ;COUNT TO AX
        OUT DMA+3, AL       ; LOW BYTE OF COUNT
        MOV AL, AH
        OUT DMA+3, AL       ; SEND HIGH BYTE
        STI
        MOV AL, 01
        OUT DMA+10, AL      ;ENABLE DMA TRANSFERS
;_____
```

;ADDITION OF NEW CODE (MM)
;―――――――――――――

```
mov dx,312h              ;SET 310 AND 311 TO OFF
in al,dx
;
mov dx, 310h             ;PORT ADDRESS
in al, dx                ;SET U11-5 TO ENABLE
;
mov dx,311h
in al,dx
ret
;
DMA_ON ENDP
;
;
;―――――――――――――――――――――――
;DMA_OFF
; STOPS DMA ON CHANNEL 1 (VIDEO SUBCODE) BY SETTING CH 1 MASK BIT.
;―――――――――――――――――――――――
;
DMA_OFF PROC NEAR
     public DMA_OFF
MOV AL, 05H
OUT DMA+10, AL           ;SET CH 1 MASK BIT
;―――――――――――――
;ADDITION OF NEW CODE (MM)
;
mov dx,312h              ;SET TO OFF (310 & 311)
in al,dx
;―――――――――――――
;mov dx, 310h
;in al,dx
;mov dx,311h
;in al,dx
RET
DMA_OFF ENDP
;―――――――――――――
;TOGGLE PROC NEAR
;    public TOGGLE
;MOV DX,312H
;IN AL,DX
;RET
```

```
;TOGGLE ENDP
;_____
;
;
;
;
;_____
;WAIT_INT
; WAITS FOR A CHANGE IN THE BIT 15 OF THE DMA CONTROLLER'S OUTPUT COUNT
; REGISTER (INDICATING A BUFFER BOUNDRY CROSSING)
;_____
;
WAIT_INT  PROC  NEAR
     public WAIT_INT CALL GET_DMA_COUNT      ;GET VALUE OF DMA COUNT REGISTER.
SUB AX, 8134            ;WHEN COUNT IS < 32730 BUFF_LOW IS EMPTY
JNC FINISH_LOW
FINISH_HIGH:            ;WAIT FOR COUNT > 32760
CALL GET_DMA_COUNT
SUB AX, 8134            ;LOOP UNTIL BIT 15 OF COUNT = 1
JC FINISH_HIGH
RET                     ;BUFF_HIGH IS EMPTIED
;
FINISH_LOW:
CALL GET_DMA_COUNT
SUB AX, 8134
JNC FINISH_LOW
RET
WAIT_INT  ENDP
;
;
;
;
;
;
;
;_____
;GET_DMA_COUNT
; READS THE CONTENTS OF THE REMAINING COUNT REGISTER OF DMA CHANNEL 1.
; RETURNS THE COUNT IN AX.
;_____
GET_DMA_COUNT  PROC  NEAR
```

```
TRY_AGAIN:
OUT DMA+12, AL        ;RESET FIRST/LAST BYTE FF.
PUSH AX
POP AX
IN AL,DMA+3           ;READ LS BYTE
IN AL, DMA+3          ;READ MS BYTE
MOV CH, AL
; READ AGAIN TO MAKE SURE OF STABLE READ
IN AL, DMA+3
MOV CL,AL
IN AL, DMA+3          ;HIGH BYTE
CMP AL, CH
JNE TRY_AGAIN         ;IF HIGH BYTE CHANGED- TRY AGAIN
MOV AX, CX
RET
GET_DMA_COUNT  ENDP
;
;
;
prog   ends
    end
```

What is claimed is:

1. A system for storing information in subcode packs to be encoded on a laser or compact disc having a main channel and a subcode channel comprising:
   a) text source means (11) for generating a plurality of lines of data in a predetermined text encoded format;
   b) a computer (15) having a random access memory, a processor and coupled to a storage device (17);
   c) first means (15a) for controlling the operation of said processor and said memory so as to load said predetermined text data into said memory and to convert the text data in said memory to a plurality of subcode packs;
   d) means for storing said plurality of subcode packs in said subcode channel.

2. The system defined by claim 1 further comprising second program means (19a) for retrieving said plurality of subcode packs and for coupling to a disc encoder (23) through an interface means (21) for converting the data in the retrieved subcode packs to electric signals useable by the disc encoder to encode said retrieved subcode pack data in the subcode channel on the laser or compact disc.

3. The system defined by claim 2 further comprising:
   a) disc player means (27) coupled to a decoder means (29) for decoding as said text data, said encoded data in the subcode channel on said laser or compact disc; and
   b) third program means (31) for retrieving said text data decoded by said decoder means and displaying said decoded text data on a display device (33).

4. The system defined by claim 3 wherein said text data generated by said text source means (11) includes start time data identifying which ones of said plurality of lines are to be displayed together on said display device, said lines of data to be displayed together also having associated therewith data specifying a beginning row, a beginning column, a column width and a row height.

5. The system defined by claim 4 wherein said first program means (15a) comprises:
   a) means for generating a subcode data file which is a multiple of at least one subcode pack in length and including an initial subcode pack having fields identifying said beginning row, said beginning column, said column width, said row height, said generating means for creating at least one subsequent subcode pack containing said text data to be displayed; and
   b) means for calculating parity for each subcode pack which has been created by said generating means according to a predetermined parity calculation standard.

6. The system defined by claim 5 wherein text data displayed by said third program means (31) is displayed according to said data identifying which ones of said plurality of lines are to be displayed together, and said data specifying said beginning row, said beginning column said column width and said row height.

7. The system defined by claim 2 wherein said second program means (19a) comprises:
   a) means for loading said plurality of subcode packs created by said first program means into a memory for access by said interface means (21);

b) means for adding predetermined synchronization bytes to each subcode pack loaded into said memory; and c) means for transferring each of said subcode packs including said added synchronization bytes to said interface means.

8. The system defined by claim 4 wherein said third program means (31) comprises:
   a) means for loading data in said subcode packs from said subcode channel into a memory;
   b) means for retrieving from said loaded data, said beginning row, said beginning column, said column width, and said row height, for each of said plurality of lines which are to be displayed together; and
   c) means for displaying said plurality of lines of text data on said display device (33) according to said retrieved beginning row, said beginning column, said column width, and said row height.

9. The system defined by claim 4 wherein said text data generated by said text source means (11) further includes data identifying one of a plurality of languages for each of said lines of data to be displayed together.

10. The system defined by claim 9 wherein said first program means (15a) comprises:
    a) means for generating a subcode data file which is a multiple of at least one subcode pack in length and including an initial subcode pack having fields identifying said one of a plurality of languages, said beginning row, said beginning column, said column width, said row height, said generating means for creating at least one subsequent subcode pack containing said text data to be displayed; and
    b) means for calculating parity for each subcode pack which has been created by said generating means according to a predetermined parity calculation standard.

11. The system defined by claim 10 wherein text data displayed by said third program means (31) is displayed according to said data identifying which ones of said plurality of lines are to be displayed together, and said one of a plurality of languages, said data specifying said beginning row, said beginning column, said column width and said row height.

12. The system defined by claim 11 wherein said third program means (31) comprises:
    a) means for loading data in said subcode packs from said subcode channel into a memory;
    b) means for retrieving from said loaded data, said one of a plurality of languages, said beginning row, said beginning column, said column width, and said row height, for each of said plurality of lines which are to be displayed together; and
    c) means for displaying said plurality of lines of text data on said display device (33) according to said retrieved one of a plurality of languages, said beginning row, said beginning column, said column width, and said row height.

13. A method for storing text information in subcode packs to be encoded on a laser or compact disc having a main channel and a subcode channel comprising the steps of:
    a) generating (11) a plurality of lines of data in a predetermined text format;
    b) controlling (15a) the operation of a computer (15) having a random access memory, a processor and coupled to a storage device (17) so as to load said predetermined text data into said memory and to convert the text data in said memory to a plurality of subcode packs,
    c) storing said plurality of subcode packs in said subcode channel.

14. The system defined by claim 13 further comprising the steps of retrieving (19a) said plurality of subcode packs and converting the data in the retrieved subcode packs to electric signals useable by a disc encoder 23 to encode said retrieved subcode pack data in the subcode channel on the laser or compact disc.

15. The system defined by claim 14 further comprising the steps of:
    a) decoding (29) as said text data, said encoded data in the subcode channel on said laser or compact disc; and
    b) retrieving (31) said decoded text data and displaying said decoded text data on a display device (33).

* * * * *

UNITED STATES PATENT AND TRADEMARK OFFICE
CERTIFICATE OF CORRECTION

PATENT NO. : 5,280,572
DATED : January 18, 1994
INVENTOR(S) : Michael Case et al.

It is certified that errors appears in the above-identified patent and that said Letters Patent is hereby corrected as shown below:

In column 2 at lines 35 and 43, change
"R, S, T, U, v and W" to -- R, S, T, U, V and W --

In column 3 at line 30, change
"R, S, T, U and v" to -- R, S, T, U and V --

Signed and Sealed this

Twenty-fifth Day of April, 1995

Attest:

BRUCE LEHMAN

*Attesting Officer*  *Commissioner of Patents and Trademarks*